US006725329B1

(12) United States Patent
Ng et al.

(10) Patent No.: US 6,725,329 B1
(45) Date of Patent: Apr. 20, 2004

(54) CACHE CONTROL SYSTEM AND METHOD HAVING HARDWARE-BASED TAG RECORD ALLOCATION

(75) Inventors: Tsun Y. Ng, Orange, CA (US); Ralph H. Castro, Lake Forest, CA (US); Virgil V. Wilkins, Perris, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/552,402

(22) Filed: Apr. 19, 2000

(51) Int. Cl.[7] ............................................. G06F 12/00
(52) U.S. Cl. ..................... 711/113; 711/118; 711/202
(58) Field of Search ............................. 711/113, 118, 711/202, 126, 129, 132, 173; 707/205

(56) References Cited

U.S. PATENT DOCUMENTS

| 5,713,003 A | * | 1/1998 | DeWitt et al. | 711/118 |
| 5,717,888 A | * | 2/1998 | Candelaria et al. | 711/113 |
| 5,765,204 A | * | 6/1998 | Bakke et al. | 711/202 |
| 5,875,352 A | * | 2/1999 | Gentry et al. | 710/22 |
| 5,875,454 A | * | 2/1999 | Craft et al. | 711/113 |
| 6,018,789 A | * | 1/2000 | Sokolov et al. | 711/113 |
| 6,092,150 A | * | 7/2000 | Sokolov et al. | 711/113 |

* cited by examiner

Primary Examiner—Donald Sparks
Assistant Examiner—Brian R. Peugh
(74) Attorney, Agent, or Firm—Milad G. Shara, Esq.; Robroy R. Fawcett, Esq.

(57) ABSTRACT

The present invention relates to a disk drive 10 comprising a cache memory 14 and a cache control system having a tag memory having a plurality of tag records, and means for allocating a tag record for responding to a host command. The cache memory has a plurality of sequentially-ordered memory clusters 46 for caching disk data stored in sectors (not shown) on disks of a disk assembly 38. Conventionally the disk sectors are identified by logical block addresses (LBAs). The cache control system 12 along with the tag memory 22 and means for allocating tag records are embedded within the cache control system 12 and thereby configured only for use in defining variable length segments of the memory clusters 46. The segments are defined without regard to the sequential order of the memory clusters 46.

20 Claims, 4 Drawing Sheets

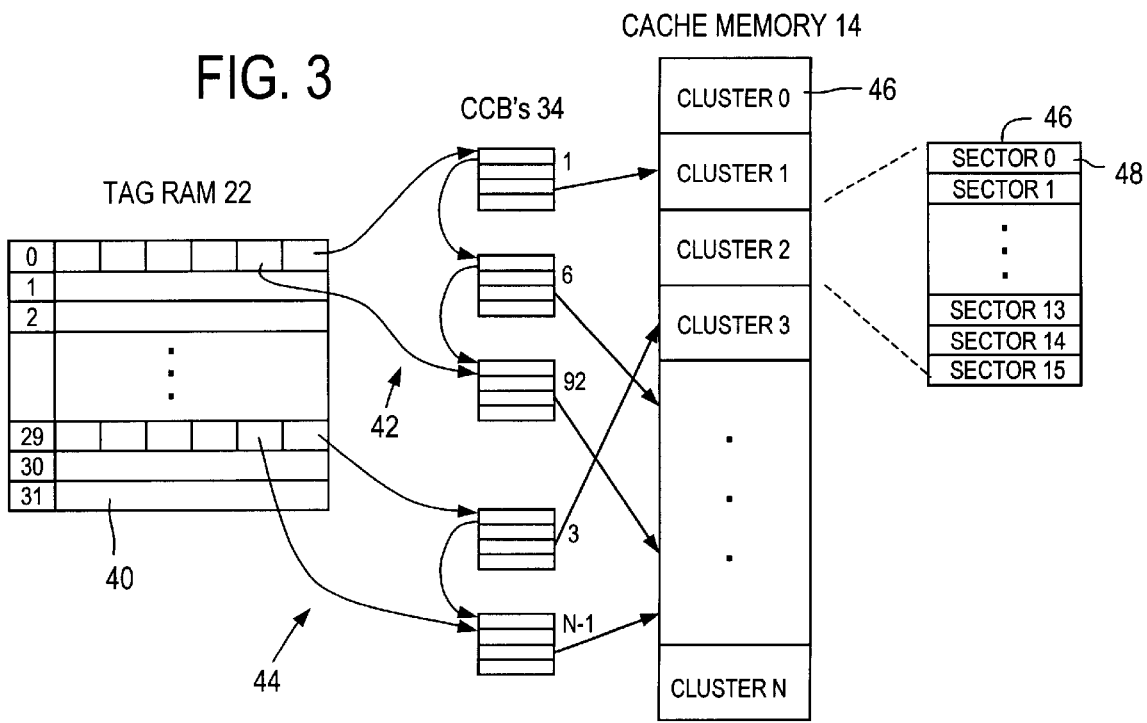
FIG. 3
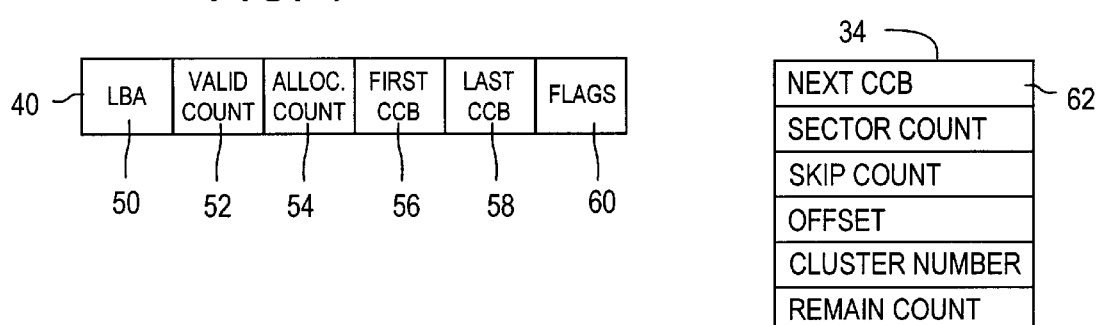
FIG. 4
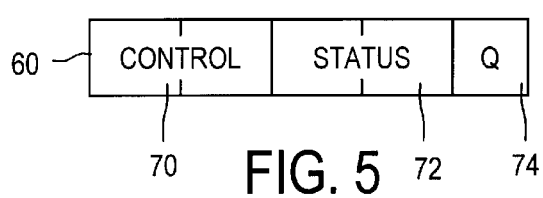
FIG. 5
FIG. 6

CACHE CONTROL SYSTEM AND METHOD HAVING HARDWARE-BASED TAG RECORD ALLOCATION

BACKGROUND OF THE INVENTION

1. Field of the Invention

The present invention relates to disk drive performance features and more particularly to a disk drive having a cache control system for improving the disk drive's response time to host commands.

2. Description of the Prior Art

A host computer stores and accesses data on a disk drive by issuing commands to the disk drive over a standardized interface. The smallest indivisible data unit addressable on a disk is a logical block or disk sector, typically of 512 bytes, and each such disk sector is assigned a logical block address (LBA). When the host computer sends a command to the disk drive, the nature of the command is specified, e.g., read or write, along with a start LBA and a count specifying the number of contiguous sectors to be transferred.

Existing disk drives typically have a semiconductor cache memory for temporarily storing disk data that is likely to be requested by a host computer. The response time latency for storing and accessing data in a semiconductor memory is much smaller than the response time latency for mechanically storing and accessing data stored on a rotating disk. Also, the disk drive typically has a microprocessor for managing the disk drive's operation. In existing disk drives, the microprocessor may be interrupted to respond a to host command. If an LBA range specified by the host command is not located in an existing cache memory segment, then the microprocessor must further allocate and configure a cache memory segment for responding to the host command. The disk drive's response to the host command and other microprocessor-managed disk operation may be delayed while the segment is allocated.

Accordingly, there exists a need for a disk drive having a disk cache system for efficiently allocating and configuring memory segments for responding to host commands. The present invention satisfies these needs.

SUMMARY OF THE INVENTION

The invention may be embodied in a disk drive, and related method, for servicing host disk commands using a cache memory having a plurality of sequentially-ordered memory clusters for caching disk data of disk sectors identified by logical block addresses. The disk drive includes a cache control system having a tag memory usable only for providing a plurality of tag records. Each tag record is associated with a range of logical block addresses and is configured to define a variable length segment of the memory clusters for caching disk data of the range of logical block addresses without regard to the sequential order of the memory clusters. The cache control system also has means for allocating a tag record for servicing a host disk command.

In more detailed features of the invention, each tag record may include a state entry indicating whether the tag record is free or available for servicing a current host disk command. The disk drive may also include means for determining a least recently used tag record and a microprocessor that de-allocates, if a tag record is not free or available for servicing a current host command, a least recently used tag record having a state entry indicating that the tag record may be reused for allocating to service a host command. The drive may include means for allocating the de-allocated tag entry record for servicing the current host disk command.

In other more detailed features of the invention, the cache control system further includes means for determining a tag entry record used for servicing a most recent host disk command. Also, the plurality of tag records may be accessed by a microprocessor and a host writable control store and the disk drive may further include means for arbitrating access to the plurality of tags records between the microprocessor and the host writable control store.

BRIEF DESCRIPTION OF THE DRAWINGS

The accompanying drawings illustrate embodiments of the present invention and, together with the description, serve to explain the principles of the invention.

FIG. 3 is a block diagram showing a table of tag records in the tag memory of the cache control system of FIG. 1, for defining segments of memory clusters using cluster control blocks.

FIG. 4 is a data structure for a tag record in the table of tag memory records of FIG. 3.

FIG. 5 is a data structure for a status and control flag in the data structure of FIG. 4.

FIG. 6 is a data structure for a cluster control block for use by the tag records of FIG. 3.

DETAILED DESCRIPTION

Figure 1:
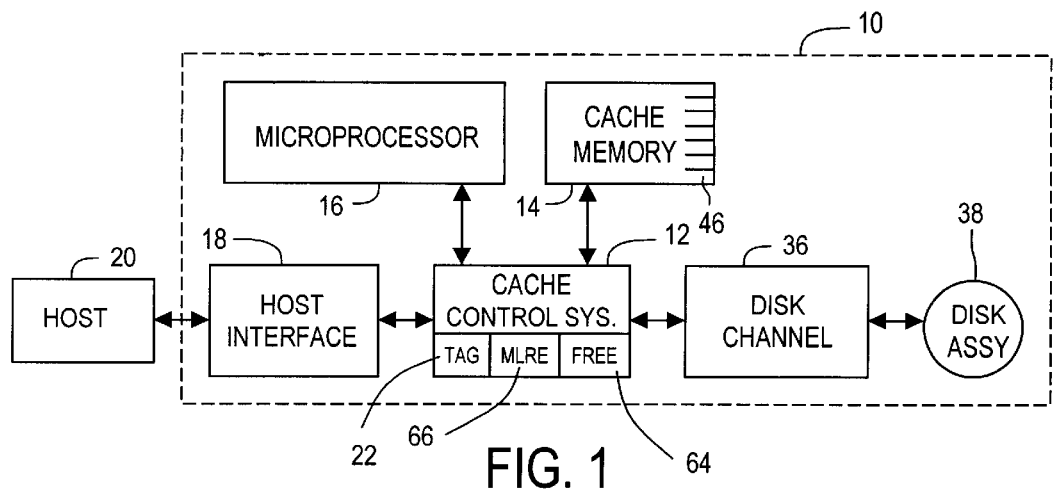
FIG. 1 is a block diagram of a disk drive having a cache control system with a tag memory usable only for providing a plurality of tag records and means for allocating a tag record for responding to a host command, according to the present invention.

With reference to FIG. 1, a disk drive 10 comprises a cache memory 14 having a plurality of sequentially-ordered memory clusters 46 for caching disk data stored in sectors (not shown) on disks of a disk assembly 38. Conventionally the disk sectors are identified by logical block addresses (LBAs). A cache control system 12 comprises a tag memory 22 that is embedded within the cache control system 12 and thereby configured only for use in defining variable length segments of the memory clusters 46 without regard to the sequential order of the memory clusters 46. Each segment of memory clusters 46 is for caching data from a contiguous range of the logical block addresses and is defined using a tag record 40 of the tag memory 22. The cache control system 12 also comprises embedded means 66 for allocating a tag record 40 for servicing a host command. The cache control system efficiently exploits embedded hardware for tag record allocation without unnecessarily interrupting other disk drive operations.

The disclosures of the following three U.S. patent applications are hereby incorporated herein by reference: application Ser. No. 09/552,404, filed on Apr. 19, 2000, now U.S.

Pat. No. 6,553,457, titled TAG MEMORY DISK CACHE ARCHITECTURE; application Ser. No. 09/552,399, filed on Apr. 19, 2000, now U.S. Pat. No. 6,601,137, titled RANGE-BASED CACHE CONTROL SYSTEM AND METHOD; and application serial number 09/552,407, filed on Apr. 19, 2000, now U.S. Pat. No. 6,606,682, title CLUSTER-BASED CACHE MEMORY ALLOCATION.

With reference again to FIG. 1, the disk drive 10 further includes a microprocessor 16, and a host interface 18. The host interface 18 receives host commands from a host 20, such as a personal computer, and transfers disk data between the disk drive 10 and the host 20. The host commands identify the disk data using a start logical block address (LBA) and a count specifying the number of contiguous sectors to be transferred. The cache memory 14 caches the disk data under the direction of the cache control system 12 and the microprocessor 16. The microprocessor 16 operates under firmware control and manages the operation of the disk drive 10 and assists hardware elements under specific conditions. The cache memory 14 is random access memory, typically 2 megabytes (MB). Generally, the larger the cache memory 14, the better the performance of the disk drive 10 in responding to host commands. The cache control system 12 includes the aforementioned tag (random access) memory (RAM) 22 and a most-recently-used/least-recently-used (MRU/LRU) engine (MRLE) 66 described below.

The disk drive 10 also includes a disk channel 36 and the aforementioned disk assembly 38. The disk assembly 38 includes a disk platter that is organized into the disk sectors, typically of 512 bytes plus redundancy bytes for error correction, which are individually addressable using a logical block address (LBA). The disk channel 36 performs conventional encoding and decoding of data written to and read from the disk.

Figure 2:
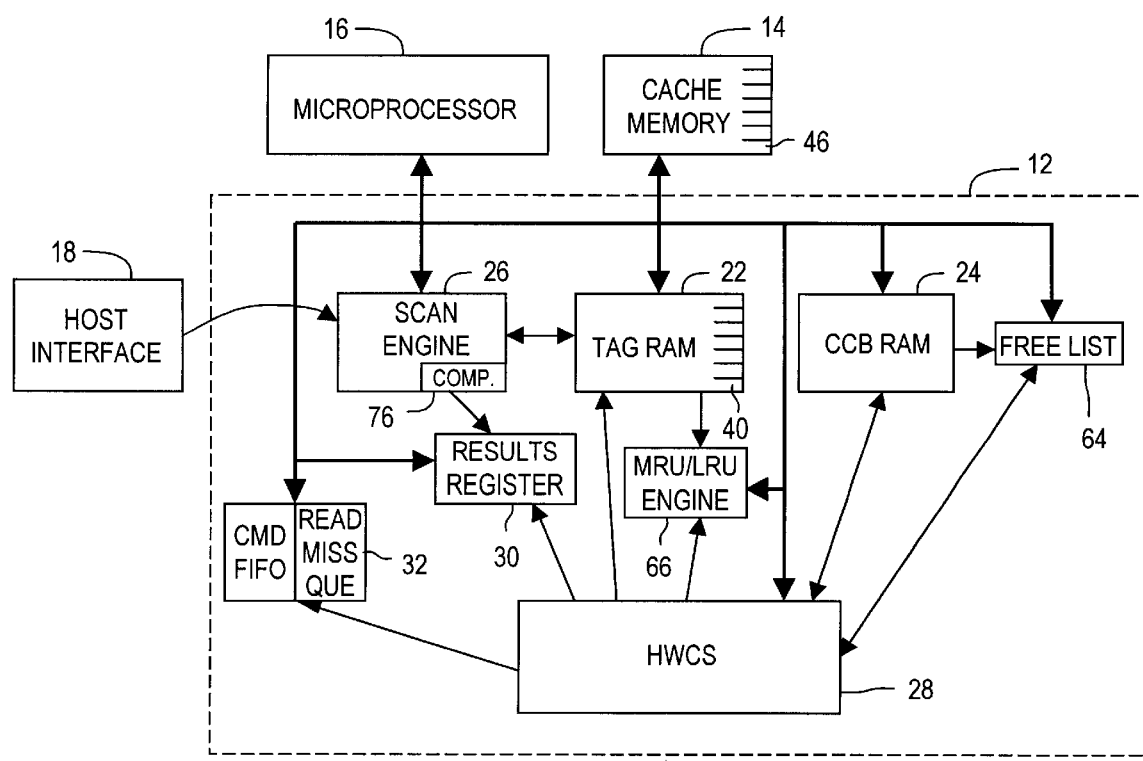
FIG. 2 is a block diagram showing the cache control system of FIG. 1 with a tag memory, according to the present invention.

The cache control system 12 is shown in more detail in FIG. 2. The cache control system 12 includes the tag memory 22 and a cluster control block (CCB) memory 24. The tag memory 22 is a static random access memory (SRAM) structure which is preferably embedded in an integrated controller chip having a table of tag or segment records. The embedded tag memory 22 thus provides higher performance and lower cost versus firmware based cache control schemes which use a general-purpose external RAM. In particular, since internal hardware engines, as described further below, may access the tag records independently from microprocessor 16, the cache control system 12 enables higher performance by off-loading microprocessor 16 and providing hardware-based processing as detailed below. The CCB memory 24 is also preferably an embedded SRAM having a plurality of records or CCBs (cluster control blocks) 34.

The tag memory 22 may be accessed by the microprocessor 16, a scan engine 26 and a host writable control store (HWCS) 28, and may be updated by the microprocessor 16 and the HWCS 28. The scan engine 26 is coupled to the host interface 18 and receives host commands or and scans the tag memory 22 for the LBA ranges associated with a host command. The scan engine 26 places the scan results in a results register 30 or, if servicing the host command further requires intervention by the microprocessor, the HWCS 28 places the command in a command queue 32. The command queue 32 has a read miss queue and a write command first-in first-out (FIFO) queue. The scan engine 26 is described in more detail in the above-referenced U.S. application Ser. No. 09/552,399, now U.S. Pat. No. 6,601,137, titled RANGE-BASED CACHE CONTROL SYSTEM AND METHOD. If a tag record 40 may be allocated for responding to a host command, then the HWCS 28 manages the response to the host command, otherwise the microprocessor 16 may assist with the response. Thus, the HWCS 28 off-loads cache tasks from the microprocessor 16 enabling response to host commands for data without microprocessor intervention.

The tag memory 22 is described in more detail with reference to FIGS. 3 and 4. The tag memory 22 has a plurality of tag records 40 that define segments, 42 and 44, of memory clusters 46 within the cache memory 14. Typically, the tag memory 22 may have 32 or 64 records dedicated to defining variable length segments. Other tag memory records (not shown) may be dedicated to single block transfers for caching small data elements stored within one memory cluster 46 that are repeatedly accessed by the host 20. The cache memory 14 is divided into sectors 48. The cache sectors 48 are bunched into consecutively numbered groups or clusters.

The tag memory 22 defines the segments of the cache memory clusters 46 using the CCBs 34. Each tag record 40 has entries or fields (50, 52, 54, 56, 58 and 60), respectively for indicating the first disk LBA assigned to the corresponding segment, the number of valid sectors in the segment, the number of sectors allocated to the segment, the first segment CCB, the last segment CCB, and state and control flags for the segment. As shown in FIG. 6, each CCB has a pointer 62 to a next CCB in a segment or to indicate that the CCB is the last CCB in the segment. Accordingly, a tag record 40 defines a segment by recording the segment's first CCB in the first CCB entry 56. The first CCB 34 has a pointer 62 to the next or second CCB in the segment. The second CCB likewise has a pointer 62 to the next CCB until the last CCB in the segment. The last CCB has an indicator such as a null value that indicates the end of the segment.

Two short exemplary segments, 42 and 44, are shown in FIG. 3. The first segment 42 is defined by the tag record number 0 to have a length of three clusters 46. The second segment 44 is defined by the tag record number 29 to have a length of two clusters 46. The tag memory 22 is described in more detail in the above-referenced U.S. application Ser. No. 09/552,404, now U.S. Pat. No. 6,553,457 titled TAG MEMORY DISK CACHE ARCHITECTURE.

The cache control system 12 (FIG. 2) also includes a free list 64. The free list 64 tracks any CCBs 34 not assigned to a tag record 40. Accordingly, all CCBs 34 are assigned to either a tag record 40 or to the free list 64. The CCBs 34 and the free list 64 is described in more detail in the above-referenced U.S. application Ser. No. 09/552,407, now U.S. Pat. No. 6,602,682, titled CLUSTER-BASED CACHE MEMORY ALLOCATION.

As shown in FIG. 5, the status and control flag entry 60 includes a 2-bit control flag 70, a 2-bit status flag 72, and a 1-bit Q scan flag 74. The control flag 70 indicates ownership of the tag record 40. Ownership of a tag record may be maintained by the microprocessor 20, the HWCS 28, or the scan engine 26. The status flag 72 indicates the status of the disk data stored in the memory clusters 14 associated with the tag record 40. The status may be free, available, valid, or valid/dirty. The free status indicates that no valid data is associated with the tag record 40. The available status indicates that valid data is associated with the tag record 40, but that the data may be discarded and the tag record 40 reused. The valid status indicates that valid data is stored in the memory clusters 46 of the segment defined by the tag record. The valid/dirty status indicates a segment of memory clusters 46 having valid data that has not been written to the disk 38. All tag records are initialized as free by the microprocessor 16. All host write data is marked as valid/dirty when it transferred into the cache memory by the HWCS 28. As data is written to the disk, the status in the tag record 40 is changed to valid. The microprocessor 16 marks a tag record 40 as available when the tag record may be reused. The Q scan flag 74 is used during a review of the tag records 40 by the MRU/LRU Engine (ALE) 66.

Figure 7:
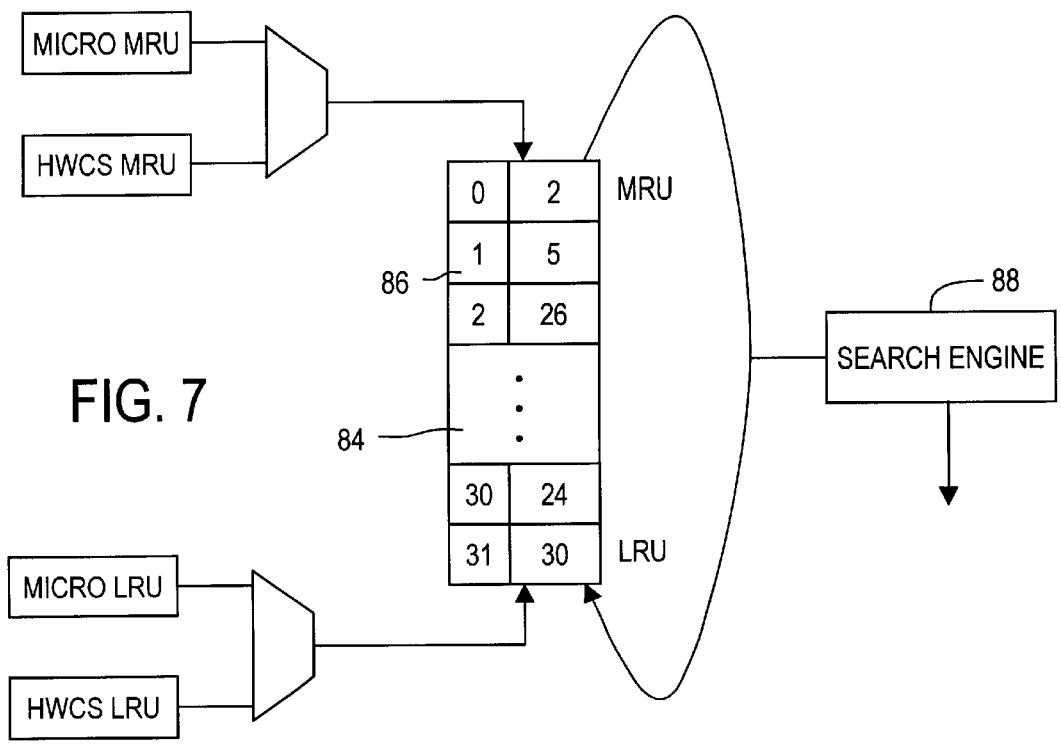
FIG. 7 is an MRU/LRU engine for searching an MRU/LRU table.
Figure 8:
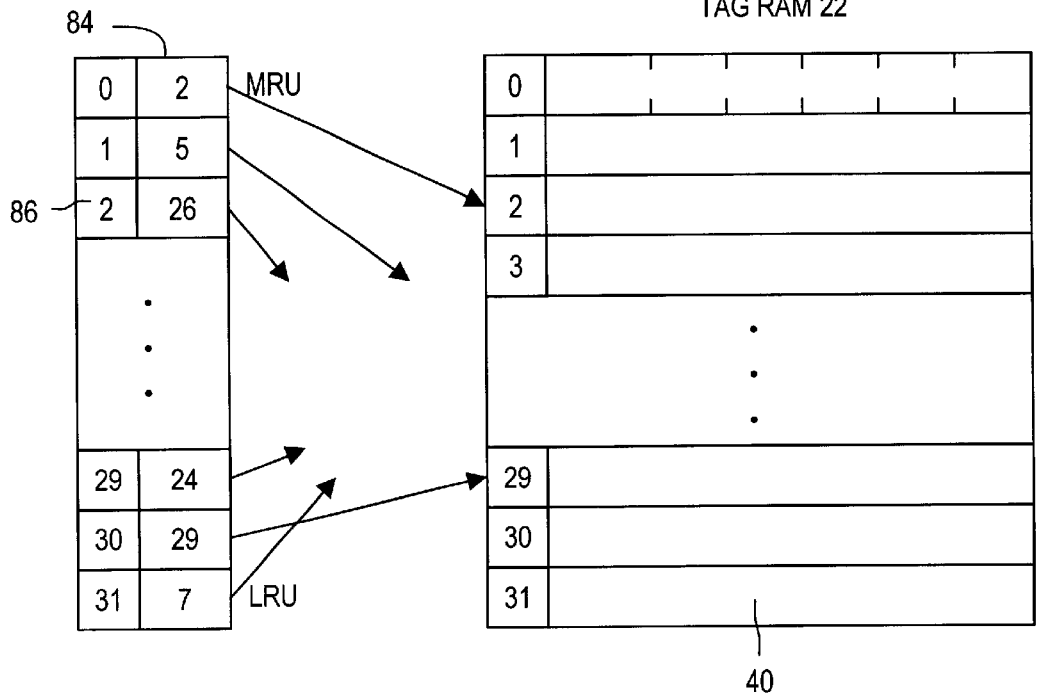
FIG. 8 is a block diagram of the MRU/LRU table of FIG. 7, for tag records in the tag memory of FIG. 2.

The MRLE 66 is described in more detail with reference to FIGS. 7 and 8. The MRLE 66 has an MRU/LRU table 84 for tracking the usage and currency of the cached data associated with each tag record 40 in the tag memory 22. The number of entries 86 in the MRU/LRU table 84 is the same as the number of tag records 40. Generally, the first entry 86 in the table 84 is the tag record 40 used in the most recent response to a host command and the last entry 86 in the table 84 is a relatively unused tag record. The MRU/LRU table 84 is shown in FIG. 8 with the MRU/LRU table entry number 0 pointing to the tag record number 2 which was the tag record 40 used in the most recent response. If the tag number 24 is used for the next response, it is removed from the table entry number 29 and placed in the table entry number 0. All of the existing tag record numbers in the table entries numbered 0–28 are shifted down one entry 86 to the table entries numbered 1–29. Accordingly, although the microprocessor 16 initializes the table 84 with the tag record numbers in order, the tag record numbers get scrambled based on usage of the disk drive 10.

Both the HWCS 28 and the microprocessor 16 may place tag record numbers at the top or at the bottom of the MRU/LRU table 84. The HWCS 28 places a tag record number at the top entry 86 of the table 84 when cache hits are detected for the corresponding tag record 40. The microprocessor 16 may place tag record numbers at the top or at the bottom of the table 84, depending on a cache de-allocation policy defined by the microprocessor's firmware. The cache de-allocation policy generally has a goal of maintaining useful data in the cache memory 14 as long as possible consistent with specific operating characteristics of the host 20.

The MRLE 66 includes a search engine 88 for locating, using the MRU/LRU table 84, tag records 40 that can be allocated for responding to a host command. Typically, the tag records 40 marked as free are first used until all of the free tag records 40 have been allocated. If the HWCS 28 receives a host command with a scan result of a cache miss, and no tag records 40 are free, then the HWCS 28 requests the search engine 88 to search the MRU/LRU table 84 from the LRU entry to the MRU entry for a tag record entry having an available status. The search engine 88 returns the number of the first LRU tag record 40 marked as available. When the available tag record 40 is provided to the HWCS 28, the HWCS 28 stuffs any corresponding CCBs 34 to the free list 64, and then requests a sufficient number of CCBs 34 from the free list 64 for forming a segment to respond to the host command.

If no tag records 40 are available, then the microprocessor 16 may interpret a tag record 40 state entry to either abandon cached data in the case of valid/not dirty data or, if dirty data is cached, write the cached data to the disk to make tag records 40 available for reuse. The microprocessor 16 also may request a search of the MRU/LRU table 84 by the search engine 88. Besides the aforementioned search for the first LRU tag record marked as available, the search engine 88 may search for the first tag record having a status of available MRU, valid LRU, valid MRU, valid/dirty LRU, the valid/dirty MRU, free LRU, free MRU, Q scan flag LRU, or Q scan flag MRU.

Figure 9:
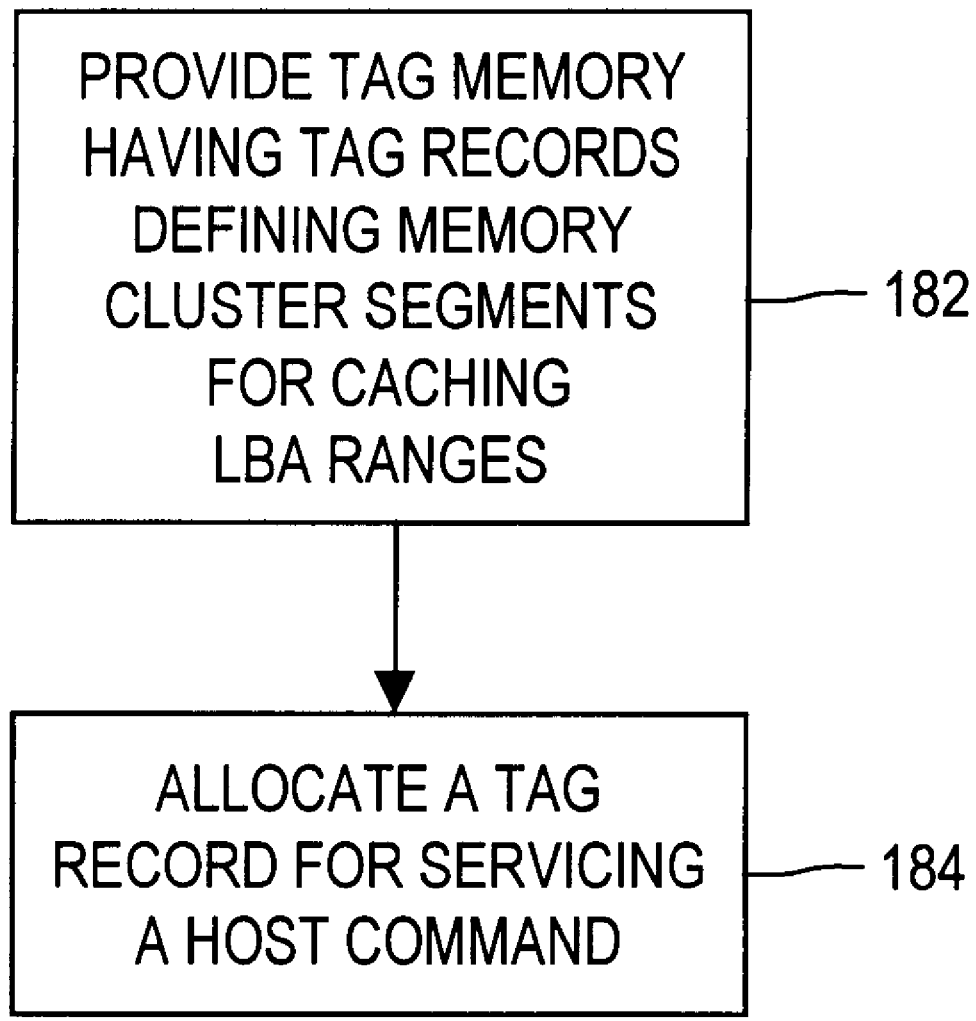
FIG. 9 is a flow chart showing a method for allocating tag records for responding to host commands, according to the present invention.

As shown in FIG. 9, the invention also may be embodied in a method for servicing host disk commands by caching disk data of disk sectors identified by logical block addresses using a cache memory having a plurality of sequentially-ordered memory clusters. A tag memory is provided (step 182) that is only usable for providing a plurality of tag records. Each tag record is associated with a range of logical block addresses and is configured to define a variable length segment of the memory clusters for caching disk data of the range of logical block addresses without regard to the sequential order of the memory clusters. A tag record is allocated (step 184) for servicing a host disk command.

We claim:

1. A disk drive for servicing host disk commands, comprising:
   a cache memory having a plurality of sequentially-ordered memory clusters for caching disk data of disk sectors identified by logical block addresses; and
   a cache control system including
      a tag memory usable only for storing a plurality of tag records, each tag record being associated with a range of logical block addresses and being configured to define a variable length segment of the memory clusters for caching disk data of the range of logical block addresses without regard to the sequential order of the memory clusters;
      means for allocating a tag record for servicing a host disk command.

2. A disk drive as defined in claim 1, wherein each tag record includes a state entry indicating whether the tag record is free or available for servicing a current host disk command.

3. A disk drive as defined in claim 1, further comprising:
   means for determining a least recently used tag record; and
   a microprocessor that de-allocates, if a tag record is not free or available for servicing a current host command, a least recently used tag record having a state entry indicating that the tag record may be reused for allocating to service a host command.

4. A disk drive as defined in claim 3, further comprising means for allocating the de-allocated tag entry record for servicing the current host disk command.

5. A disk drive as defined in claim 1, wherein the cache control system further includes means for determining a tag entry record used for servicing a most recent host disk command.

6. A disk drive as defined in claim 1, wherein the plurality of tag records may be accessed by a microprocessor and a host writable control store and the disk drive further comprises means for arbitrating access to the plurality of tags records between the microprocessor and the host writable control store.

7. A disk drive as defined in claim 1, wherein the cache memory is separate from the tag memory of the cache control system.

8. A cache control system for servicing host disk commands by caching disk data of disk sectors identified by logical block addresses using a cache memory having a plurality of sequentially-ordered memory clusters, comprising:
   a tag memory only usable for storing a plurality of tag records, each tag record being associated with a range of logical block addresses and being configured to define a variable length segment of the memory clusters for caching disk data of the range of logical block addresses without regard to the sequential order of the memory clusters; and means for allocating a tag record for servicing a host disk command.

9. A cache control system as defined in claim 8, wherein each tag record includes a state entry indicating whether the tag record is free or available for servicing a current host disk command.

10. A cache control system as defined in claim 8, further comprising:

means for determining a least recently used tag record; and a microprocessor that de-allocates, if a tag record is not free or available for servicing a current host command, a least recently used tag record having a state entry indicating that the tag record may be reused for allocating to service a host command.

11. A cache control system as defined in claim 10, further comprising means for allocating the de-allocated tag entry record for servicing the current host disk command.

12. A cache control system as defined in claim 8, wherein the cache control system further includes means for determining a tag entry record used for servicing a most recent host disk command.

13. A cache control system as defined in claim 8, wherein the plurality of tag records may be accessed by a microprocessor and a host writable control store, and the cache control system further comprises means for arbitrating access to the plurality of tags records between the microprocessor and the host writable control store.

14. A cache control system as defined in claim 8, wherein the tag memory is separate from the cache memory.

15. A method for servicing host disk commands by caching disk data of disk sectors identified by logical block addresses using a cache memory having a plurality of sequentially-ordered memory clusters, comprising:

providing a tag memory only usable for storing a plurality of tag records, each tag record being associated with a range of logical block addresses and being configured to define a variable length segment of the memory clusters for caching disk data of the range of logical block addresses without regard to the sequential order of the memory clusters; and allocating a tag record for servicing a host disk command.

16. A cache method as defined in claim 15, wherein each tag record includes a state entry indicating whether the tag record is free or available for servicing a current host disk command.

17. A cache method as defined in claim 15, further comprising:

determining a least recently used tag record; and de-allocating, if a tag record is not free or available for servicing a current host command, a least recently used tag record having a state entry indicating that the tag record may be reused for allocating to service a host command.

18. A cache method as defined in claim 17, further comprising allocating the de-allocated tag entry record for servicing the current host disk command.

19. A cache method as defined in claim 15, further comprising determining a tag entry record used for servicing a most recent host disk command.

20. A method for servicing host disk commands as defined in claim 15, wherein the tag memory is separate from the cache memory.

* * * * *